April 28, 1964  R. B. COLTEN  3,130,497

MOTION CONTROL APPARATUS

Filed Feb. 24, 1960  3 Sheets-Sheet 1

INVENTOR.
Robert B. Colten
BY
Hugh L. Fisher
ATTORNEY

April 28, 1964 R. B. COLTEN 3,130,497
MOTION CONTROL APPARATUS
Filed Feb. 24, 1960 3 Sheets-Sheet 2

INVENTOR.
Robert B. Colten
BY
Hugh L. Fisher
ATTORNEY

United States Patent Office 3,130,497
Patented Apr. 28, 1964

3,130,497
MOTION CONTROL APPARATUS
Robert B. Colten, Oak Park, Mich., assignor to General Motors Corporation, Detroit, Mich., a corporation of Delaware
Filed Feb. 24, 1960, Ser. No. 10,649
8 Claims. (Cl. 33—23)

This invention relates generally to follower apparatus and particularly to improvements in control systems adapted, although not exclusively, for controlling such apparatus.

In the past, whether the control systems for follower apparatus were mechanical, hydraulic, electrical, or combinations of these, many difficulties have been encountered particularly as to attainment of accurate results, and the equipment has been cumbersome, complicated, expensive, and generally unreliable. Among the difficulties encountered is the failure to maintain accurate alignment between a sensing element and the surface to be traced; traversal speeds are irregular; faulty resolution of the information required to follow contours, especially when from some remote operator station, whether manual or automatic; lack of responsiveness such that lag occurs; and maintenance made difficult by the complexity and the need for constant calibration due to the type of components used in the controls for these systems.

With these problems in mind, the invention contemplates a follower apparatus that is both manually and automatically operable; that, by means of a novel sensing arrangement, maintains an accurate relationship with the surface to be followed; that can follow both conductive and non-conductive surfaces; that affords constant speed operation; that employs a unique control system for accurately resolving input information into corresponding output information; and that is simple and uncomplicated, requiring a minimum of maintenance and calibration.

Specifically, the invention provides new electrical circuitry that utilizes variable impedances to resolve input voltages into related output voltages. More specifically, the invention employs cooperating potentiometers, the outputs of which are sine-cosine related.

Another important objective of the invention is, with the foregoing circuitry, to combine therewith input and output transducers so related that the signals from the input transducer are resolved into components suitable for controlling the output transducer.

A related, more specific, objective of the invention is to afford automatic follower apparatus of a character that employs an input sensing transducer for developing a signal corresponding to the spatial relationship between the sensing element thereof and a contour on a pattern. This signal is by the circuitry compared to a reference, and deviations are resolved into one set of sine-cosine related command voltages. Additionally, an operating voltage reflective of a selected tracing speed is resolved into a second set of sine-cosine related command voltages indicative also of the desired direction the sensing element is to proceed along the contour. These two sets of signals are vectorially summed and the summed voltage through control of motive means causes the motive means to maneuver the sensing element along the contour at the predetermined spatial relationship, the selected speed, and the desired direction.

The foregoing and other objects and advantages of this invention will be apparent from the following description and the accompanying drawings in which.

*Follower Mechanism*

Figure 1:
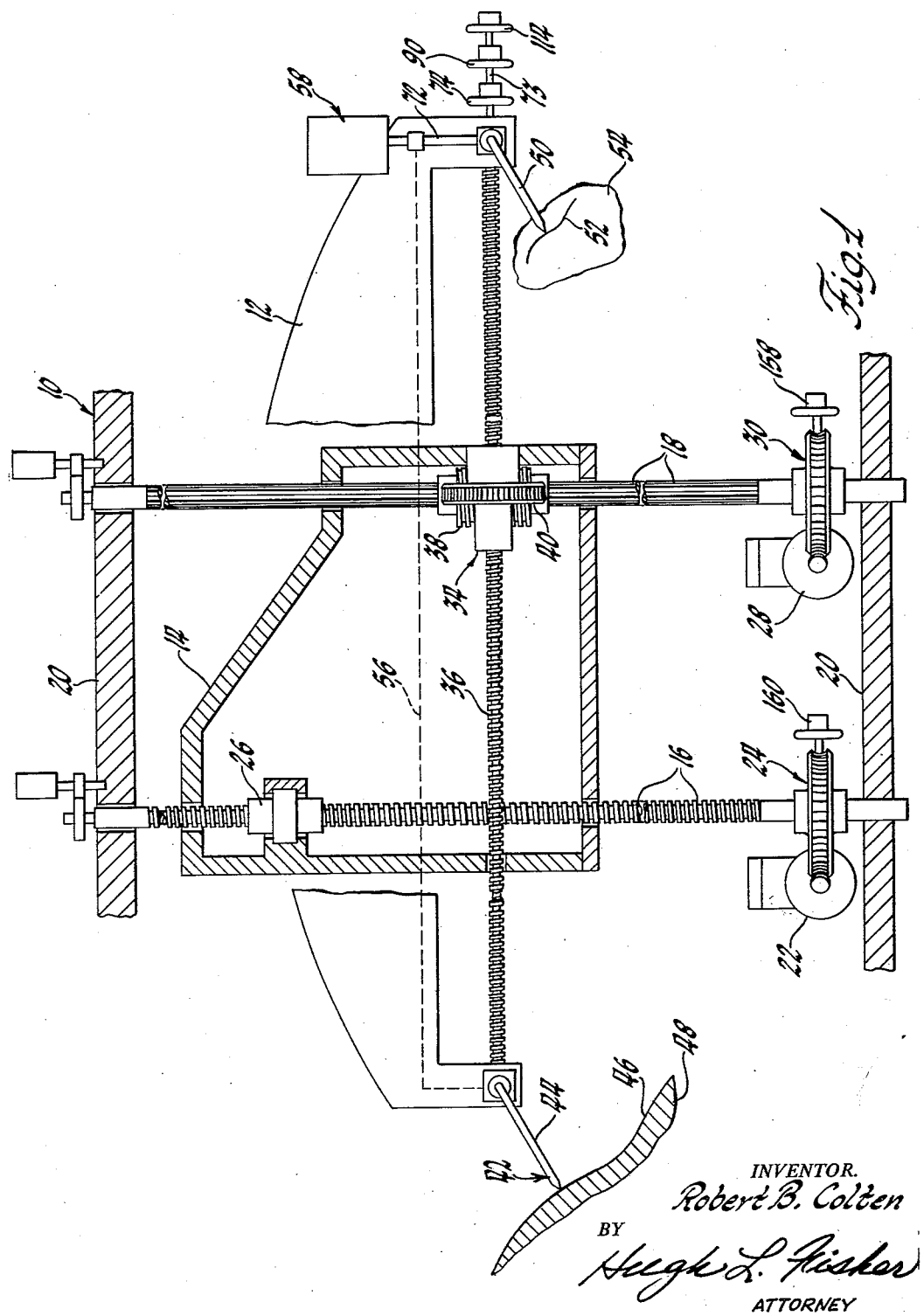
FIGURE 1 is a schematic diagram of mechanism for maneuvering a sensing transducer relative to a model or pattern surface according to the invention.

Referring to the drawings, and particularly FIGURE 1, a reproducing or follower mechanism incorporating the principles of the invention is designated generally at 10. This reproducing mechanism includes a horizontally positioned boom 12 and a carriage denoted at 14. Vertical and horizontal drive shafts 16 and 18 rotatably supported at their opposite ends by a frame 20 cause the boom 12 to be maneuvered vertically and/or horizontally as will be explained.

Rotation of the vertical drive shaft 16 is accomplished by vertical drive motor 22 and gearing 24 of the worm and worm wheel type. When revolved, the vertical drive shaft 16 will, through a screw coupler 26, cause the carriage 14 to be maneuvered vertically up or down according to the direction of rotation. Similarly, a horizontal drive motor 28, through horizontal drive gearing 30, also of the worm and worm wheel type, revolves the horizontal drive shaft 18. The horizontal drive shaft 18, through a spline connection, drives gearing 34, which in turn axially shifts a screw shaft 36 secured at opposite ends to the extreme ends of the boom 12. This gearing 34 includes a worm 38 revolvable with the horizontal drive shaft 18 and a worm wheel 40 that is revolvably and fixedly supported by the carriage 14 so as to be movable therewith and that has an internal threaded connection with screw shaft 36. Hence, when the worm wheel 40 is revolved, the screw shaft 36 will be caused to move leftwardly or rightwardly. Accordingly, since the ends of the screw shaft are secured to the boom 12, the boom 12 will be moved horizontally left or right whenever the shaft 18 is rotated.

The action causing the screw shaft 36 to shift leftwardly or rightwardly is the same as that produced when making a close adjustment with the well known vernier calipers. A small thumb wheel is revolved while its carrier, the major scale, is maintained stationary. As a result, the screw on which the thumb wheel is mounted shifts axially and adjustably positions the minor scale. In this embodiment, the worm wheel 40 also cannot shift relative to the carriage 14; hence, when the worm wheel 40 is rotated, the screw 36 moves axially and carries therewith the boom 12.

As thus far explained, it can be seen that rotation of the vertical drive shaft 16 will maneuver the carriage 14 up or down. Since the screw shaft 36 is supported by the carriage 14, the boom 12 will be moved up and down also. The horizontal movement of the boom 12 is produced by rotation of the horizontal drive shaft 18, the rotation of which is transferred through gearing 34, thus shifting the screw shaft 36 and causing it to carry therewith the boom 12 either to the left or right as viewed in FIGURE 1.

If only the horizoneal drive shaft 18 is revolved, i.e., the vertical drive shaft 16 is stationary, the carriage 14 as can be seen will not move. On the other hand, if both the vertical drive shaft 16 and the horizontal drive shaft 18 are moved, the boom 12 will be moved both vertically and horizontally simultaneously, the resultant movement being due to the combination of the two movements in both directions.

As observed in the left part of the FIGURE 1 diagram, a sensing transducer is denoted generally by the numeral 42, and comprises a sensing element as probe 44. The probe 44 is pivotally secured to the end of the boom 12 and positioned adjacent a surface 46 of a pattern or model 48. On the opposite end of the boom 12 a follower element as stylus 50 is pivotally situated, and will, as will become apparent, reproduce a contour 52 corresponding to the contour of the model surface 46, on a mounted drawing 54. The plane of the drawing 54 relative to the stylus 50 can be altered as determined by the particular application. For example, if the plane of the drawing 54 is to be parallel to the plane of the model surface 46, then obviously the stylus 50 will require an appropriate angular bend therein. The probe 44 and stylus 50 are drive connected in any appropriate fashion for conjoint movement. One suggested way is through a mechanical connection as shafting denoted at 56. Another suggested mode of accomplishing this connection is electrically through the use of synchros as will be readily understood by those versed in the art.

Manual Probe Control

When following the contour of the surface 46 with the probe 44, it is desirable that the probe 44 be made substantially perpendicular to the surface at all times so that the results are more accurate, i.e., the spacing between the pointed end of the probe 44 and the surface 46 can be maintained more accurately if this perpendicular or normal relationship is maintained. Otherwise, some other part of the probe may at times be closer to the surface than the pointed end and since a predetermined gap is to be maintained, as will be explained, the normal relationship is desirable. To accomplish this and further to permit the normal relationship to be maintained at some remote station, a manual probe control 58 in FIGURE 1 is utilized. The details of this control 58 are illustrated in the left part of the FIGURE 4 diagram and reference is now made to this figure. In this part of the diagram, the numeral 60 denotes a voltage source that is adjustable to produce two outputs of magnitudes bearing some predetermined proportion to each other, e.g., equal and of opposite polarity.

The negative voltage from the source 60 is altered by manipulation of a probe control dial 62, which in turn alters the setting of a probe control linear potentiometer 64. The resultant negative voltage is then applied to a summing circuit 66 and thereafter to a probe amplifier 68. The magnified probe control voltage is applied to a motor 70 constructed and arranged to rotate in opposite directions as determined by the magnified probe control voltage. The rotation of the probe motor 70 will, through a shaft 72 suitably drive connected to shafting 56 revolve probe 44 until the probe 44 is normal to the surface 46 and through a shaft 73 (see FIGURE 1) revolve stylus 50 to a corresponding position. The rotation of the shaft 73 will maneuver a position indicator linear potentiometer 74 revolvable therewith a corresponding amount such that a positive voltage from the source 60 is supplied to the probe summing circuit 66. When the rotation of the motor 70 is such that the positive voltage is equivalent to the negative voltage determined by the manually operated probe control potentiometer 64, the two voltages will cancel and accordingly the motor 70 will stop.

To remove fluctuations from the probe control 58, due to, e.g., quick starts and stops of the motor 70, a tachometer generator 76 arranged to revolve at a speed corresponding to that of the motor 70 is so arranged as to supply a feedback voltage, the magnitude of which is determined by an adjustable potentiometer 78, to the summing circuit 66.

Figure 3:
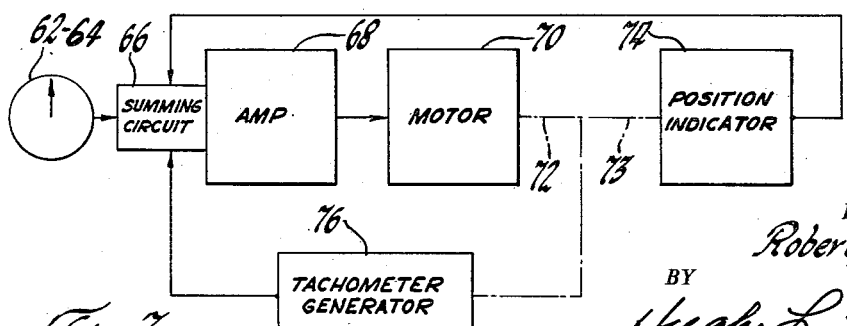
FIGURE 3 is a block diagram of a follow-up system for manually maneuvering the mechanism sensing transducer from a remote station.

Briefly summarizing the operation of the manual probe control 58, reference is made to FIGURE 3 and it is assumed that the manual probe control dial 62 is revolved to a position that causes a negative 90 volts to be applied by the probe control potentiometer 64 to the summing circuit 66 along with feedback voltage. The amplified output from the summing circuit 66 and the amplifier 68 will cause the motor 70 to revolve until the position of the position indicator potentiometer is such that a positive 90 volts is applied to the summing circuit 66 and cancels the negative 90 volts. Consequently, the motor 70 will stop, there being no output from the amplifier 68.

Gap Spacing Circuitry

Figure 2:
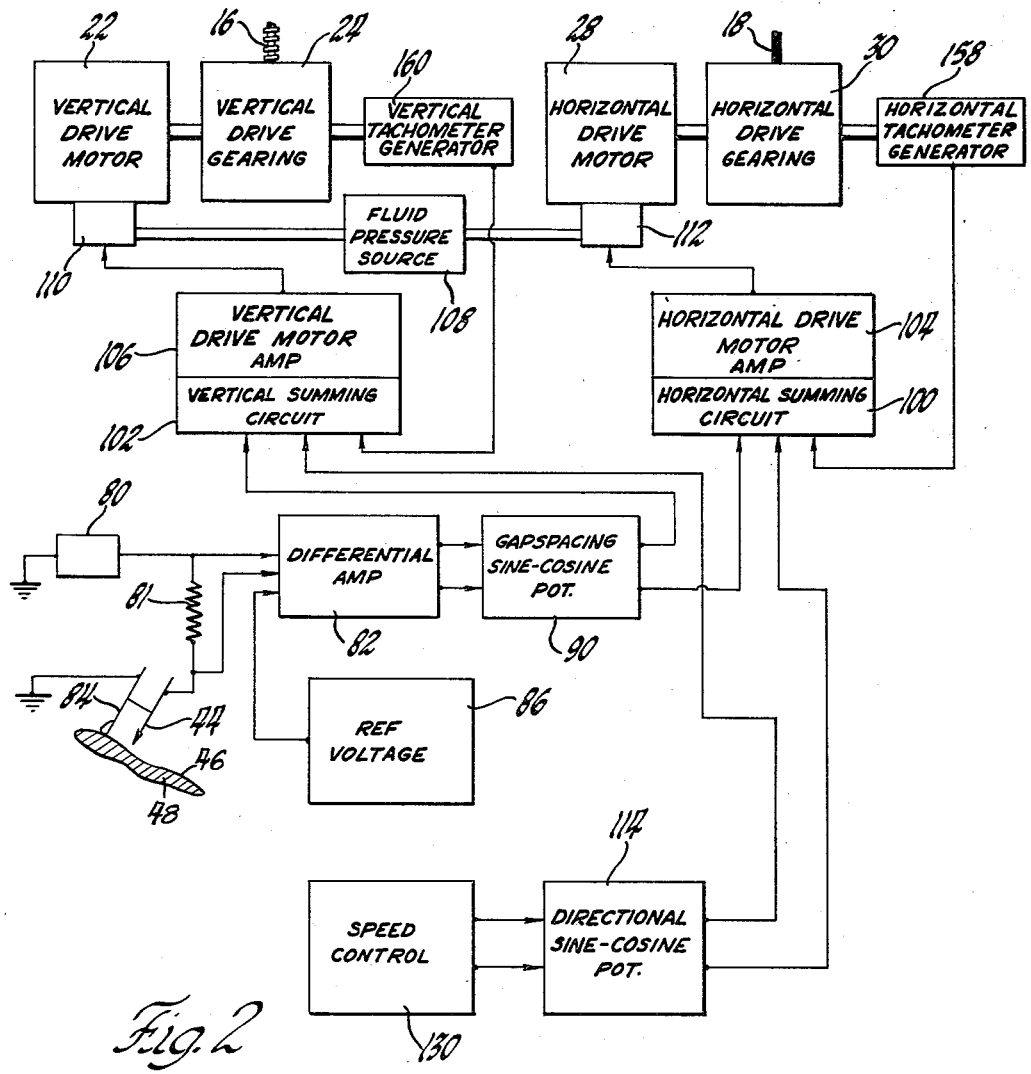
FIGURE 2 is a block diagram of a control system for operating the mechanism.

As previously mentioned, the probe 44 has the end thereof displaced from the model surface 46 to a fixed amount during operation. This eliminates the need to maintain a constant pressure between the probe 44 and the surface 46 if actual contact was made and also overcomes other problems such as those encountered with rough surfaces. To explain further, reference is made to FIGURE 2 where a voltage source 80 is shown in series with the gap between the probe 44 and the surface 46 and a metering resistor 81. The voltage is intended to be adequate to ionize the gap at some maximum spacing so as to complete a circuit from the grounded voltage source through metering resistor 81, probe 44, across the gap and to the model 48, which would be grounded if conductive. It is the voltage across the metering resistor 81 that is applied to the input of a differential amplifier 82. If the model is non-conductive, then, as disclosed in application S.N. 784,232, to Mustonen et al., entitled Follower Probe Head, filed December 31, 1958, a conductive fluid can be caused to be flowed over the surface 46 in the vicinity of the probe. To complete the circuit under these conditions, it is necessary to add a distortable spring 84 arranged so as to be secured to and insulated from the probe 44 and in some appropriate way grounded to the frame 20. As can be seen, this latter circuit will extend from the grounded frame through the distortable spring 84, the conductive fluid, across the gap and to the probe 44.

It is preferred that the voltage from the gap circuit applied to the input of the differential amplifier 82 be negative where it can be compared with a reference voltage from a positive source 86. To explain further, in the embodiment to be described it is assumed that with a minimum gap there will be maximum current flow, the gap offering minimum resistance thereto, and consequently, the voltage drop across the metering resistor 81 will be of a maximum negative polarity. At the other extreme, and that is with a maximum gap, there will be a minimum current flow across the gap, assuming the gap remains ionized so as to permit conduction. As a result, the voltage drop across the metering resistor 81 will be minimum. The significance of this becomes apparent if values are arbitrarily selected, which are to be considered for illustrative purposes only. Assume that .006 of an inch gap affords optimum operation and that the corresponding reference voltage is set at a positive 4 volts. Necessarily then, the voltage of negative polarity across metering resistor 81 and applied to the input of the differential amplifier 82 must be a negative 4 volts if the actual gap is .006, so that when these two voltages are compared, a zero output will be obtained. Therefore, no alteration in the spacing will be made by the control system. But, if the gap is less than .006, a greater negative voltage will be applied to the differential amplifier 82, and after a comparison with the reference voltage, a negative output signal will be developed indicating that the probe must be moved upwardly if the probe 44 is above the surface 46 as displayed in FIGURE 1. Obviously, if the gap is greater than .006, the negative voltage corresponding thereto will be less than the reference voltage so that a positive signal will be developed for advising the control system that the probe 44 must be moved downwardly.

With the foregoing explanation of how a gap signal is developed, it will now be explained how this signal is utilized in the FIGURE 4 circuitry. The amplifier 82, which compares the gap signal voltage and the reference voltage, develops from the resultant summation, two output error voltages, each of equal magnitude but of opposite polarity, and these dual error voltages are applied to opposite terminals 87 and 88 of a fixed winding 89 forming a part of a gap spacing potentiometer denoted generally at 90. This same fixed winding 89 is grounded at points 92 and 94, 90° displaced from terminals 87 and 88. Completing the potentiometer structure are horizontal and vertical component contact arms 96 and 98 displaced 90° and revolvable, in the same way as the position indicator potentiometer 74, with shaft 73. Hence, the contact arms 96 and 98 will reflect the position of the probe 44, since the probe 44, the stylus 50, and the shaft 73 will all be revolved corresponding amounts by the control 58. With this alignment, and as will be further explained, the voltages on the contact arms 96 and 98 will vary respectively as the sine and the cosine functions of the angular position of the probe 44 so that the input error signal from the differential amplifier 82 is resolved into sine-cosine related command voltages in a manner well-known. The horizontal contact arm 96 communicates with the input of a horizontal summing circuit 100 so that the sine function or horizontal component of the error voltage to the potentiometer 90 is applied thereto. This horizontal component of the error voltage will be equivalent to the product of the error voltage and the sine of the angle assumed by the probe 44. Similarly, the vertical contact arm 98 communicates with the input of a vertical summing circuit 102 and the cosine function or vertical component of the error voltage is delivered to this vertical summing circuit 102. The vertical component of the error voltage will correspond to the product of the error voltage and the cosine of this same angle assumed by probe 44. The two summing circuits 100 and 102 have their outputs in communication respectively with the inputs to horizontal and vertical drive motor amplifiers 104 and 106. The magnified voltages are then utilized to control the operation of the vertical and horizontal drive motors 22 and 28. Of course, the magnitude of the two command voltages will be determined by the gap signal voltage and the angular position of the probe 44, which position the contact arms 96 and 98 will also assume. Although various type drive motors may be employed, hydraulically operated motors have been found to afford the greatest response. The supply of fluid pressure to the motors from a source shown at 108 may be effectively controlled by combination force motor and servo valve assemblages, the one for the vertical drive motor 22 being designated at 110 and that for the horizontal drive motor 28, at 112. Detailed explanation of these assemblages 110 and 112 is believed unnecessary since they may be of any known type such as those disclosed in the application S.N. 837,607, to Colten et al., filed September 2, 1959. Briefly, energization of the force motor by the amplified signal will cause in accordance therewith a servo valve to be so positioned as to alter the supply and exhaust of pressure fluid to and from the drive motors 22 and 28. In this way, the amplified signal will determine both speed and direction of rotation of the drive motors 22 and 28 as is well understood by those versed in the art.

Figure 4:
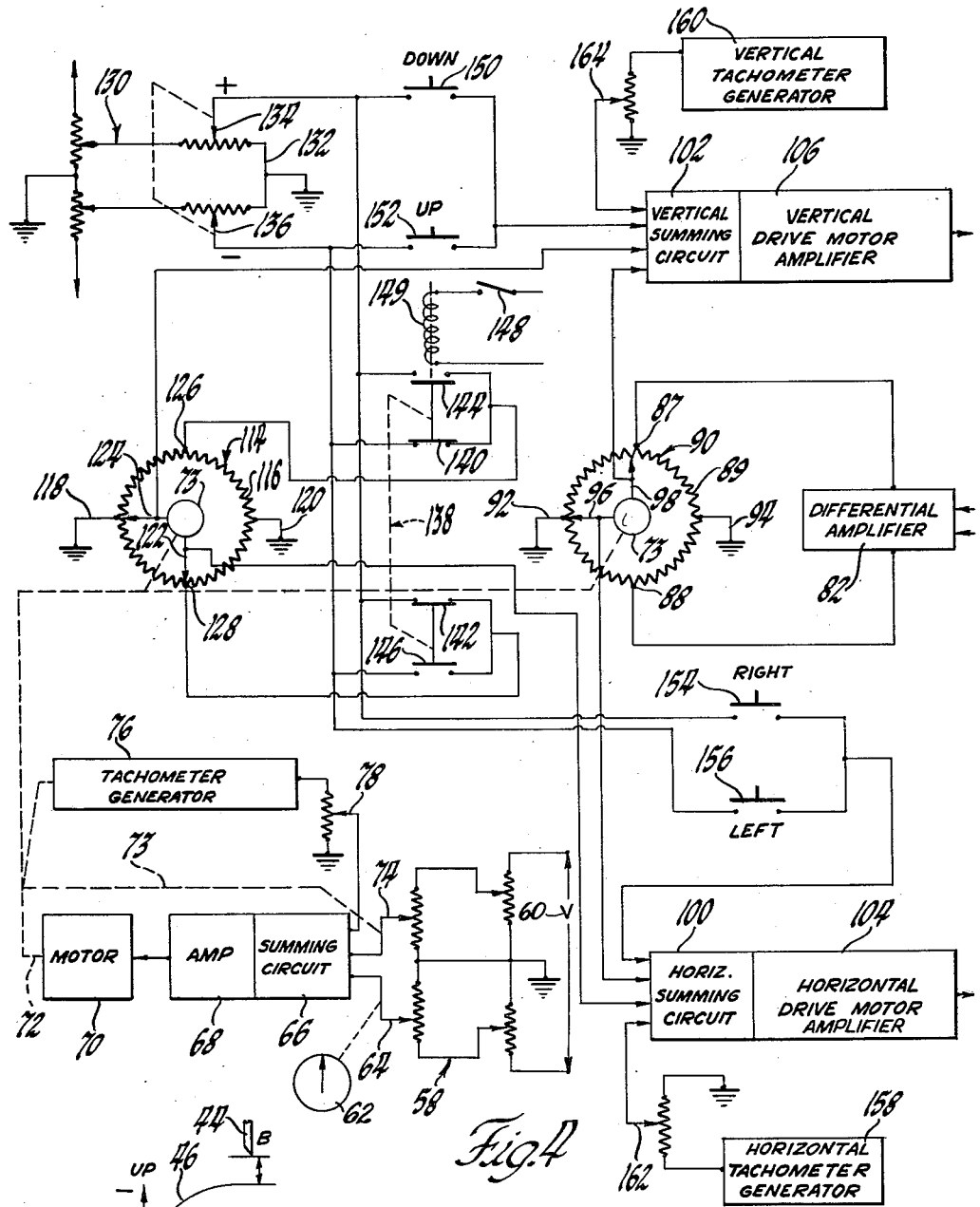
FIGURE 4 is a circuit diagram depicting the details of the control and follow-up systems.

Again examining the gap spacing potentiometer 90 in FIGURE 4, it will be noted that in the depicted position the horizontal contact arm 96 is grounded and that the vertical contact arm 98 is opposite terminal 87. This is one of the many positions the contact arms 96 and 98 can assume and indicates in this instance that the probe 44 must be moved upwardly or downwardly if an input signal is received, the reason being that the sine function will be zero and no voltage will be applied to the horizontal contact arm 96 since it is grounded. But the cosine function will be maximum or unity. If the gap is greater than desired, a positive resultant error voltage will be obtained after a comparison with the positive reference voltage by the differential amplifier 82; hence, a positive error voltage will be applied to the terminal 87 and likewise a negative error voltage of the same magnitude to the opposite terminal 88. The corresponding vertical command voltage applied to the input of the vertical summing circuit 102 will be equivalent to the product of this resultant error voltage and the cosine function, which is unity. Because the vertical command voltage is positive, after being amplified, it will cause the force motor and servo valve assemblage 112 to actuate the vertical drive motor 22 so as to move the probe downwardly until the reference voltage is balanced by the gap signal voltage.

Obviously, if the probe 44 must be moved sidewise as well as up and down due to a particular configuration of the surface 46 being traced, the contact arms 96 and 98 will be displaced from their illustrated positions and both summing circuits will receive a command voltage sine-cosine related so that the probe 44 will assume the proper spacing, the movement being made thereby along a path, which is the vectorial resultant of the two components of movement determined by the command voltages. It should be mentioned here that since the resultant of these two components will always be of a fixed value, the speed at which the probe recovers or returns to the desired spatial relationship with surface 46 will always be the same.

Figure 5:
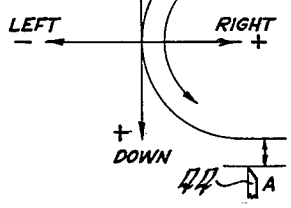
FIGURE 5 is a diagram graphically illustrating one operational phase of the mechanism.

The reason for having available at the terminals 87 and 88 of the directional potentiometer 90 two equal magnitude and opposite polarity signals can best be appreciated by examining FIGURE 5. If the surface 46 to be followed is somewhat circular as seen, and the probe 44 is in the top position B at a greater than desired distance from the surface, a positive command voltage will be supplied, as just mentioned, to the vertical summing circuit 102 and the probe 44 will be caused to move downwardly. If the same spacing error is intentionally maintained and the probe 44 is maneuvered around the surface 46 to the position A at the bottom of the contour 46, it becomes apparent that if this command voltage remained positive, a corresponding correction would move the probe 44 further away from the surface 46. This problem is solved by having available the negative voltage at terminal 88 for when the probe 44 is moved 180°, the contact arm 98 will be opposite this terminal 88 and cause the maximum negative voltage to be applied to the input of the vertical summing circuit 102. Of course with the polarities assumed, the probe 44 being in the position A, will be moved upwardly and correctly alter the gap spacing.

Direction and Speed Control Circuitry

The gap spacing potentiometer 90 and its associated circuitry, as can be appreciated from the foregoing explanation, only positions the probe 44 so that the prescribed gap (in this embodiment .006 of an inch) is maintained. But, to trace or reproduce the contour of the surface 46, it is necessary for the probe 44 to proceed either to the left or right from the position seen in FIGURE 1 and at some convenient speed. For this purpose another sine-cosine potentiometer hereinafter referred to as the directional potentiometer and denoted generally by the numeral 114, is employed to produce in a somewhat similar manner to the gap spacing potentiometer 90 sine-cosine related command voltages that bear some fixed relationship to the desired speed.

The need for a further resolution of the voltages will become clear with the following explanation, and therefore, it is only mentioned at this point that if the probe 44 was to trace left or right, along a horizontally positioned surface, there would be no need for such a resolution. However, this is not true, e.g., a straight surface may be obliquely positioned with respect to the horizontal plane, and of course, this would require movement of the probe in two directions to obtain a resultant movement that would maintain the probe 44 in proper angular and spatial relationship with the oblique surface.

The directional potentiometer 114 being similar to the gap spacing potentiometer 90, also includes a fixed winding identified by the numeral 116. The winding 116 is grounded at the points 118 and 120 and has coacting with the fixed winding a horizontal component contact arm 122 and a vertical component contact arm 124, each of which is 90° displaced from the other, and each of which is revolvable with the shaft 73 in the same way as the position indicator potentiometer 74 and the gap spacing potentiometer 90. As with the gap spacing potentiometer 90, directional potentiometer 114 is aligned so that the horizontal contact arm 122 provides the sine function and the vertical contact arm 124 the cosine function. One difference, and a significant one, can be noted from an inspection of the two potentiometers 90 and 114, this being the angular relationship of the corresponding contact arms. As depicted, the horizontal and vertical contact arms 122 and 124 of the directional potentiometer 114 are 90° displaced from the corresponding contact arms 96 and 98 of the gap spacing potentiometer 90. This difference and the reason will be set forth in greater detail as the description proceeds.

The voltage resolved by the directional potentiometer 114 is supplied to the opposite terminals 126 and 128 from a speed control viewed generally in the upper left part of the FIGURE 4 diagram and denoted by the numeral 130. This speed control 130 comprises a linear potentiometer 132 that is provided with two contact arms 134 and 136. These contact arms 134 and 136 are manually adjustable and so related to a suitable source of positive and negative poled voltage as to have applied thereto voltages of equal magnitude and opposite polarity. Specifically, and for explanatory purposes, arm 134 determines the positive voltage and arm 136 the negative voltage. The arms 134 and 136 are adjusted together, and the magnitude of the voltage determined in this manner will correspond to the desired speed at which the probe is to trace or scan.

Whether the probe 44 is to scan left or right, is determined by a relay mechanism 138 that is interposed between the input terminals 126 and 128 of the potentiometer 114 and the speed control 130. Normally, the relay mechanism 138 is so positioned that contacts 140 and 142 are closed, thereby completing the circuits respectively from the negative speed control contact arm 136 and the input terminal 126 and from the positive speed control contact arm 134 and the input terminal 128. As a result, a positive speed control voltage is applied to the terminal 128 and a negative equivalent to the terminal 126.

If, on the other hand, it is desired to trace or scan in the opposite direction, normally open contacts 144 and 146 are closed and the normally closed contacts 140 and 142 are opened. This can be accomplished by closing a switch 148 so as to energize in some suitable manner a winding 149 for the relay mechanism 138. This causes a reversal of the connections and circuits respectively from the positive speed control contact arm 134 to the input terminal 126, and from the negative speed control contact arm 136 to the input terminal 128 are completed.

With this description in mind, first consider the directional potentiometer 114 as having the contact arms thereof aligned as viewed. With this disposition, and with the further assumption that the relay mechanism 138 is adjusted for scan right operation, i.e., left to right with contacts 140 and 142 closed, the cosine function will be zero since the vertical component contact arm 124 is grounded at 118. The sine function will be maximum or unity so that a maximum positive horizontal command voltage of a magnitude determined by the speed control setting will be supplied to the input of the horizontal summing circuit 100. Upon amplification by the horizontal drive motor amplifier 104, the amplified command voltage will cause the horizontal drive motor 28 to maneuver the probe 44 to the right along a horizontal path. If, instead of scanning right, it is desired to scan left, the switch 148 is closed as mentioned and now a negative command voltage will be furnished the horizontal summing circuit 100 and the probe 44 will move from right to left, again horizontally.

It is at this point apparent why the corresponding contact arms of each of the sine-cosine potentiometers 90 and 114 are 90° out of phase. As has been explained, the gap spacing potentiometer 90 with the viewed alignment only causes the vertical drive motor 22 to operate either to move the probe 44 upwardly or downwardly and no signal is provided to the horizontal summing circuit 100 therefrom. Necessarily, to trace, the horizontal drive motor 28 must be actuated whether the scan is to be to the left or to the right, and of course, this is accomplished with the directional potentiometer contact arm 122 in the depicted position.

This explanation applies to movement along a horizontal surface, but again if the surface is tilted or is oblique to the horizontal, the directional potentiometer contact arms 122 and 124 will be accordingly angularly re-positioned to provide both cosine and sine functions that, when vectorially added, always produce the same resultant, thus producing a constant speed assuming the speed control setting is not altered.

Automatic and Manual Control

The foregoing description of the gap spacing and directional potentiometers 90 and 114, and the operation related thereto, covers automatic operation, but if it is desired to maneuver the probe 44 manually, e.g., to move the probe 44 to some starting position quickly, the connections between the summing circuits 100 and 102 and the gap spacing and directional potentiometers 90 and 114 may be interrupted in any appropriate way such as by opening the circuits to their horizontal and vertical summing circuits 100 and 102 and grounding the outputs of these potentiometers 90 and 114. As a result, the speed control voltage from the speed control 130 can be applied directly to the horizontal and vertical summing circuits 100 and 102.

For instance, if it is desired to move the probe 44 up and down manually, the vertical drive motor 22 must be operated. If downward movement is desired, a down switch 150 is closed completing a circuit between the input to the vertical summing circuit 102 and the positive speed control contact arm 134. This positive speed control voltage according to the polarity conventions previously assumed will cause the probe 44 to move downwardly. On the other hand, if upward movement of the probe 44 is wanted, an up switch 152 is closed with the result that another circuit, this one extending from the negative speed control contact arm 136 to the input of the vertical summing circuit 102, will be completed and the negative speed control voltage will cause the desired upward movement of the probe 44.

Right and left movement of the probe 44 is effected in a similar manner. For example, closing of a right switch 154 will cause a positive voltage determined by the positive speed control potentiometer contact arm 134 to be applied to the input of the horizontal summing circuit 100. Again, with assumed polarity conventions, such a positive voltage will cause the horizontal drive motor 22 to be so energized as to effect left to right tracing movement. A closure of a left switch 156 supplies an equivalent negative voltage and produces right to left movement of the probe 44.

Operational Summary

Since manual operation of the reproducing or follower apparatus 10 has been just described, this portion of the description will be concerned primarily with summarizing the automatic operation.

Therefore, with the probe 44 at the starting point, the speed control 130 is set at the desired speed of operation. The relay device 138 is positioned for the proper scan direction and the dial 62 manually manipulated to locate the probe 44 so as to be normal to the surface 46 at the starting point. Assume initially that the probe 44 is to scan right or move downwardly and rightwardly along the FIGURE 1 depicted contour of surface 46, rightward movement will start at the preset speed, and the operator will continue to rotate the probe control dial 62 so that the position indicator potentiometer 74 will be maneuvered until the voltage determined thereby equals that determined by the probe control potentiometer 64 and angular positioning of the probe 44 is that wanted, this being done by visual inspection. Of course, the movement of the probe 44 in this fashion causes not only the shafting 56 to be maneuvered but also the shafts 72 and 73 to be revolved corresponding amounts; consequently, the gap spacing and directional potentiometers 90 and 114 assume settings corresponding to that of the position indicator potentiometer 74. If there is any deviation in the gap spacing between the probe 44 and the surface 46 from that established by the adjustment of the reference voltage source 86, the corresponding gap signal voltage will, after being compared with the reference voltage, cause an error voltage to be developed and magnified by the differential amplifier 82 and dual opposite polarity equivalents applied to the input terminals 87 and 88 to the gap spacing potentiometer 90. Horizontal and vertical command voltages will be developed as determined by the positioning of the gap spacing potentiometer arms 96 and 98, and applied to the horizontal and vertical summing circuits 100 and 102.

The speed control voltages supplied to the directional potentiometer input terminals 126 and 128 will also be resolved into horizontal and vertical command voltages, each of which is 90° out of phase with the corresponding command voltages from the gap spacing potentiometer 90 for the reasons explained. These command voltages representing direction of scan and speed are vectorially summed by the summing circuits 100 and 102 with the command voltages from the gap spacing potentiometer 90. Also summed by the summing circuits are feedback voltages from horizontal and vertical tachometer generators 158 and 160. The magnitude of the feedback voltages from the horizontal and vertical tachometer generators 158 and 160 are controlled respectively by adjustable potentiometers 162 and 164. These tachometer generators perform similarly to the previously described tachometer generator 76 in that they are driven at a speed corresponding to that of the associated drive motor and supply of feedback voltage that reduces fluctuations in the drive system, particularly those due to sudden changes in speed and direction. The vectorial summation of these voltages by the respective summing circuits 100 and 102 produces a single resultant voltage that is amplified and thereafter utilized to control through the force motor and servo motor assemblages 110 and 112 horizontal and vertical drive motors 28 and 22 respectively. The carriage 14 produces the necessary vertical movement due to rotation of the vertical drive shaft shaft 16 and the needed horizontal motion from the rotation of horizontal drive shaft 18 and the screw shaft 36 so that the resultant movement of the probe 44 will be along the contour of the surface 46 at the proper spacing.

If the mechanism 10 is only being employed to trace or follow along the surface 46, there will be no concern for the stylus 50. However, if a reproduction is to be made of the contour of the surface 46 on the drawing board mounted paper 54, the stylus 50 will, because it is attached to the opposite end of the boom 12, produce a reproduction in a proportion determined by the ratio between the radial lengths of the probe 44 and the stylus 50, keeping in mind that each will have the same angular movement and always be parallel. In other words, the scale of the reproduced contour 52 can be greater or smaller than that of the contour of the surface 46. For example, if a circle is being traced, the size or radius of the circle can be increased merely by increasing the operating radius of the stylus 50.

It should be mentioned here that a moving surface can be followed by the probe 44 and also a moving target can be pursued by utilizing the probe 44 as a sight.

The speed at which the probe is proceeding across the surface 46 can be altered at will and the gap spacing also by respectively altering the settings of the speed control 130 and the reference voltage source 86. To change the direction of scan merely requires that the switch 148 be closed in the previously described manner. The only additional burden on the operator is the need to keep the probe 44 normal to the surface 46 for the desired accurate results.

It can be seen from the foregoing, and particularly after an inspection of the circuitry employed to control the reproducing machine 10, that the system is relatively simple and uncomplicated. The use of sine-cosine potentiometers produces accurately resolved voltages and there is no need for calibration of this relationship of the components once a proper alignment is made. The electrohydraulic drive system offers very responsive as well as shockless operation. Moreover, the gap spacing principle employed negates any problems related to maintenance of a predetermined contact pressure between the surface and the probe. Additionally, the lack of need for actual contact is advantageous in that a clay surface can be traced or reproduced without defacing the contours.

The invention is to be limited only by the following claims.

I claim:

1. Motion control apparatus comprising, in combination, an input transducer including an angularly positionable sensing element, the input transducer being constructed and arranged so as to develop a signal voltage corresponding in magnitude to the spacing between the tip of the sensing element and an object, a source of reference voltage corresponding in magnitude to a predetermined spacing between the tip of the sensing element and the object, means comparing the signal and reference voltages so as to develop two error voltages each of opposite polarity and of a magnitude corresponding to the difference between the signal and reference voltages, a sine-cosine potentiometer, means correlating the setting of the potentiometer with the orientation of the sensing element, the potentiometer being energized by the two error voltages so as to provide two sine-cosine related command voltages, two motors operative to maneuver the sensing element along paths substantially at right angles to each other, feedback means operative to provide a feedback voltage corresponding to the speed of each motor, and summing networks disposed between each motor and the potentiometer for vectorially adding the respective command and feedback voltages so as to produce a corresponding summed voltage, the two motors also each being operatively connected to the potentiometer and controlled by the respective summed voltage so as to cause in accordance therewith the predetermined spacing between the tip of the sensing element and the object to be maintained throughout 360° relative motion between the sensing element and the object.

2. In apparatus for following a contour, the combination of an input transducer including a positionable sensing element, the input transducer being constructed and arranged so as to develop a signal voltage corresponding in magnitude to the spacing between the tip of the sensing element and the contour, plural sources of voltage, one source providing a reference voltage and another source a speed control voltage, the reference and speed control voltages corresponding in magnitude respectively to a predetermined spacing between the tip of the sensing element and the contour and to a desired speed at which the sensing element is to follow the contour, first and second potentiometer means for producing sine and cosine related voltages, means correlating the settings of each of the first and the second potentiometer means with the orientation of the sensing element, the first potentiometer means being energized by the difference in magnitudes between the signal and reference voltages, the second potentiometer means being energized by the speed control voltage, and an output transducer operatively connected to each of the first and the second potentiometer means and controlled thereby so as to cause the input transducer to follow the contour at the desired speed while the predetermined spacing between the tip of the sensing element and the contour is maintained.

3. In apparatus for following a contour, the combination of an input transducer including a positionable sensing element, the input transducer being operative to develop a signal corresponding in magnitude to the spacing between the tip of the sensing element and the contour, plural sources of voltage, one source providing a reference voltage and another source affording a speed control voltage, the reference and speed control voltages corresponding in magnitude respectively to a predetermined spacing between the tip of the sensing element and the contour and to a desired speed at which the sensing element is to follow the contour, first and second potentiometer means for producing sine and cosine related voltages, means correlating the settings of each of the first and the second potentiometer means with the orientation of the sensing element, the first potentiometer means being energized by the difference in magnitudes between the signal and the reference voltages so as to provide a first set of sine-cosine related command voltages, the second potentiometer means being energized by the speed control voltage so as to provide a second set of sine-cosine related command voltages, and an output transducer operatively connected to the first and the second potentiometer means and controlled by the two sets of command voltages so as to cause the sensing element to follow the contour at the desired speed while the predetermined relationship between the tip of the sensing element and the contour is maintained throughout 360° of relative movement between the input transducer and the contour.

4. In apparatus for following a contour, the combination of a sensing transducer including a positionable sensing element, the sensing transducer being constructed and arranged so as to develop a signal corresponding in magnitude to the spacing between the tip of the sensing element and the contour, plural sources of voltage, one source providing a reference voltage and another source affording a speed control voltage, the reference and speed control voltages corresponding in magnitude respectively to a predetermined spacing between the tip of the sensing element and the contour and to a desired speed at which the sensing element is to follow the contour, means comparing the signal and reference voltages so as to develop two error voltages each of opposite polarity and of a magnitude corresponding to the difference between the signal and reference voltages, a plurality of sine-cosine potentiometers, means correlating the settings of each of the sine-cosine potentiometers with the orientation of the sensing element, one of the potentiometers being energized by the two error voltages so as to provide a first set of sine-cosine related command voltages, another of the potentiometers being energized by the speed control voltage so as to provide a second set of sine-cosine related command voltages, and motor means operatively connected to the sine-cosine potentiometers and controlled by the two sets of command signals so as to cause the sensing element to follow the contour at the desired speed while the predetermined spacing between the tip of the sensing element and the contour is maintained throughout 360° of relative movement between the sensing element and the contour.

5. In apparatus for following a contour, the combination of a sensing transducer including an angularly positionable sensing element, the sensing transducer being constructed and arranged so as to develop a signal corresponding in magnitude to the spacing between the tip of the sensing element and the contour, plural sources of voltage, one source affording a reference voltage corresponding in magnitude to a predetermined spacing between the tip of the sensing element and the contour and another source furnishing two speed control voltages each of opposite polarity and of a magnitude corresponding to a desired speed at which the sensing element is to follow the contour, means comparing the signal and reference voltages so as to develop two error voltages each of opposite polarity and of a magnitude corresponding to the difference between the signal and reference voltages, a plurality of sine-cosine potentiometers, means correlating the settings of each of the sine-cosine potentiometers with the orientation of the sensing element, one of the potentiometers being energized by the two error voltages so as to provide a first set of sine-cosine related command voltages and another of the potentiometers being energized by the two opposite polarity speed control voltages so as to provide a second set of sine-cosine related command voltages, and a plurality of motors operative to maneuver the sensing element along paths substantially at right angles to each other, the plurality of motors also being operatively connected to the sine-cosine potentiometers, one of the motors being controlled by the first set of command voltages and another of the motors being controlled by the second set of command voltages so as to cause the sensing element to follow the contour at the desired speed while the predetermined spacing between the tip of the sensing element and the contour is maintained throughout 360° of relative movement between the sensing element and the contour.

6. In apparatus for following a contour, the combination of a sensing transducer including an angularly positionable sensing element, the sensing transducer being constructed and arranged so as to develop a signal voltage corresponding in magnitude to the spacing between the tip of the sensing element and the contour, plural sources of voltage, one source affording a reference voltage corresponding in magnitude to a predetermined spacing between the tip of the sensing element and the contour and another source furnishing two speed control voltages each of opposite polarity and of a magnitude corresponding to a desired speed at which the sensing element is to follow the contour, means comparing the signal and reference voltages so as to develop two error voltages each of opposite polarity and of a magnitude corresponding to the difference between the signal and reference voltages, a plurality of sine-cosine potentiometers, means correlating the settings of each of the sine-cosine potentiometers with the orientation of the sensing element, one of the potentiometers being energized by the two error voltages so as to provide a first set of sine-cosine related command voltages and another of the potentiometers being energized by the two opposite polarity speed control voltages so as to provide a second set of sine-cosine related command voltages, and two motors operative to maneuver the sensing element along paths substantially at right angles to each other, feedback means operative to provide a feedback voltage corresponding to the speed of each motor; and summing networks disposed between each motor and each potentiometer for vectorially adding the respective set of command voltages and the feedback voltage so as to produce an equivalent summed voltage, each motor also being operatively connected to the sine-cosine potentiometers and being controlled by the respective summed voltage therefor so as to cause in accordance therewith the sensing element to follow the contour at the desired speed while maintaining the predetermined spacing between the tip of the sensing element and the contour throughout 360° of relative movement between the sensing element and the contour.

7. In apparatus for reproducing a contour from a pattern, the combination of an input transducer including a positionable sensing element, the input transducer being operative to develop a signal voltage corresponding in magnitude to the spacing between the tip of the sensing element and the pattern, follower means operatively joined to the input transducer so as to produce a corresponding contour, plural sources of voltage, one source affording a reference voltage corresponding in magnitude to a predetermined spacing between the tip of the sensing element and the pattern and another source of voltage providing a speed control voltage corresponding in magnitude to a desired speed at which the input transducer is to trace the pattern contour, first and second potentiometer means for producing sine and cosine related voltages, means correlating the settings of the first and second potentiometer means with the orientation of the sensing element, the first potentiometer means being energized by the difference in magnitudes between the signal and reference voltages so arranged as to provide a first set of sine-cosine related command voltages, the second potentiometer means being energized by the speed control voltage so arranged as to provide a second set of sine-cosine related command voltages, means maneuvering the sensing element so as to maintain a predetermined angular relationship between the sensing element and the pattern, and an output transducer operatively connected to the first and second potentiometer means so as to be controlled by the two sets of command voltages and effective to operate the input transducer in accordance therewith and thereby cause the input transducer to follow the contour at the desired speed while the predetermined spacing between the tip of the sensing element and the contour is maintained thereby causing the follower means to reproduce the contour.

8. In apparatus for reproducing a contour from a pattern, the combination of a sensing transducer including an angularly positionable sensing element, the sensing transducer being constructed and arranged so as to develop a signal corresponding in magnitude to the spacing between the tip of the sensing element and the pattern, a follower element operatively joined to the sensing element so as to produce a corresponding contour, plural sources of voltage, one source of voltage affording a reference voltage corresponding in magnitude to a predetermined spacing between the tip of the sensing element and the pattern, another source of voltage providing two speed control voltages each of opposite polarity and of a magnitude corresponding to a desired speed at which the sensing element is to follow the pattern contour, means comparing the signal and reference voltages so as to develop two error voltages each of opposite polarity and of a magnitude corresponding to the difference tween the signal and reference voltages, plural sine-cosine potentiometers each including contact arms displaced 90 degrees apart, means correlating the settings of the sine-cosine potentiometers with the orientation of the sensing element, one of the potentiometers having the contact arms thereof displaced 90 degrees from the corresponding contact arms of another of the potentiometers, said one potentiometer being energized by the two error voltages so as to have applied to the contact arms thereof sine-cosine related command voltages, said another of the potentiometers being energized by the opposite polarity speed control voltages so as to have applied to the contact arms thereof a second set of sine-cosine related command voltages, manually operable means maneuvering the sensing element so as to cause the sensing element to be substantially normal to the surface of the pattern, two motors operative to maneuver the sensing element along paths substantially at right angles to each other, and summing networks disposed between each motor and the corresponding contact arms of each potentiometer for vectorially adding the respective command voltages so as to produce an equivalent summed voltage, the two motors each being operatively connected to the sine-cosine potentiometers so as to be controlled by the respective summed voltage therefor and thereby cause in accordance therewith the sensing element to follow the contour at the desired speed while the predetermined spacing between the tip of the sensing element and the contour is maintained throughout 360° of relative movement between the sensing element and the contour and in a direction determined by the polarity of the speed control voltage thereby causing the follower element to reproduce the contour.

References Cited in the file of this patent

UNITED STATES PATENTS

| | | |
|---|---|---|
| 1,714,984 | Nebel | May 28, 1929 |
| 2,380,357 | Ziebolz | July 10, 1945 |
| 2,388,555 | Kuehri et al. | Nov. 6, 1945 |
| 2,499,178 | Berry et al. | Feb. 28, 1950 |
| 2,677,310 | Campbell | May 4, 1954 |
| 2,828,673 | Campbell | Apr. 1, 1958 |
| 2,868,087 | Morgan | Jan. 13, 1959 |

OTHER REFERENCES

Berry publication, "Optical Contour Follower," General Electric Review, June 1950, pages 44–47.